(No Model.)  5 Sheets—Sheet 1.

R. P. COUGHLIN.

MANUFACTURE OF CLOCK CASES AND OTHER ARTICLES FROM PLASTIC MATERIAL.

No. 379,450. Patented Mar. 13, 1888.

Witnesses.
Robt Everett,
Vinton Coombs.

Inventor:
Reese P. Coughlin.
By James L. Norris
Atty.

(No Model.) 5 Sheets—Sheet 2.
R. P. COUGHLIN.
MANUFACTURE OF CLOCK CASES AND OTHER ARTICLES FROM PLASTIC MATERIAL.
No. 379,450. Fig. 2. Patented Mar. 13, 1888.
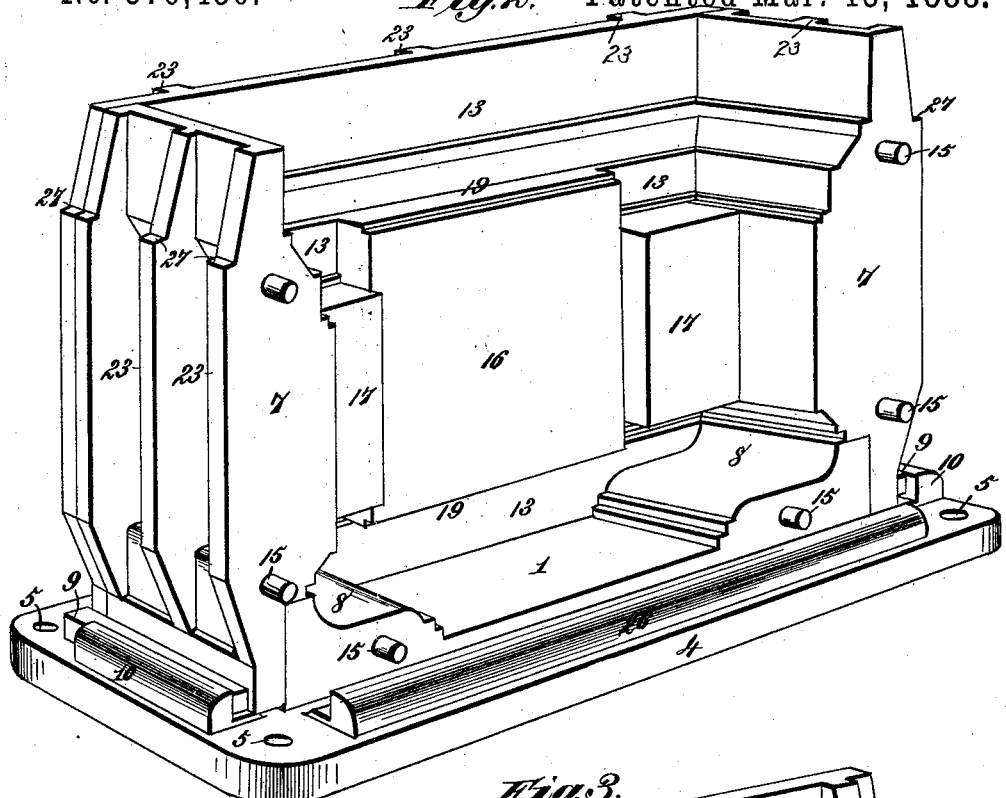
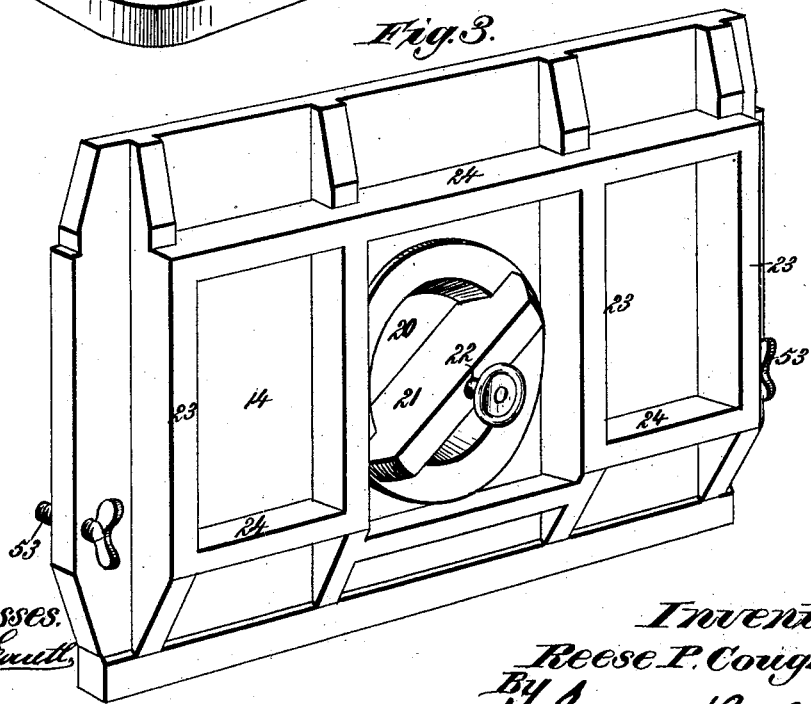
Witnesses.
Inventor
Reese P. Coughlin.
By James L. Norris.
Atty.

(No Model.) 5 Sheets—Sheet 3.
R. P. COUGHLIN.
MANUFACTURE OF CLOCK CASES AND OTHER ARTICLES FROM PLASTIC MATERIAL.
No. 379,450. Patented Mar. 13, 1888.
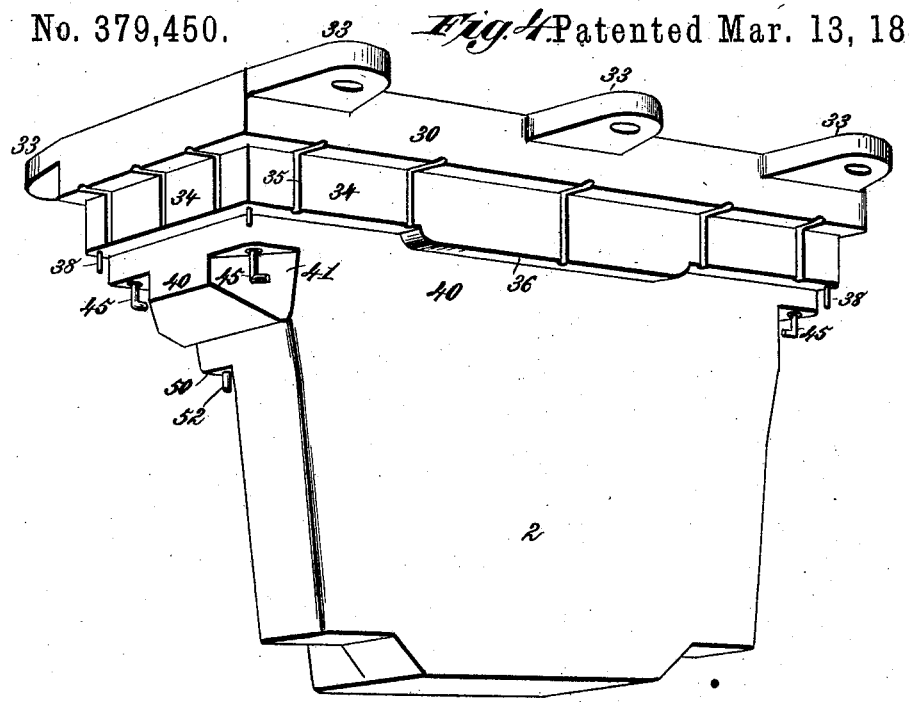
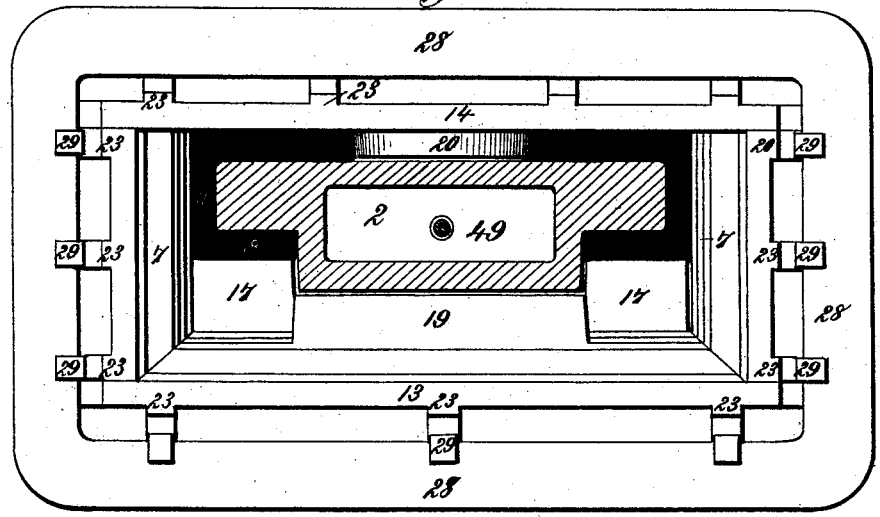
Witnesses.
Robt Emmett,
Vinton Coombe.
Inventor:
Reese P. Coughlin.
By James L. Norris
Atty.

(No Model.) 5 Sheets—Sheet 4.
R. P. COUGHLIN.
MANUFACTURE OF CLOCK CASES AND OTHER ARTICLES FROM PLASTIC MATERIAL.

No. 379,450. Patented Mar. 13, 1888.

Witnesses.
Robert Erwitt,
Vinton Coombs.

Inventor:
Reese P. Coughlin,
By James L. Norris.
Atty.

(No Model.)  5 Sheets—Sheet 5.
R. P. COUGHLIN.
MANUFACTURE OF CLOCK CASES AND OTHER ARTICLES FROM PLASTIC MATERIAL.
No. 379,450.  Patented Mar. 13, 1888.
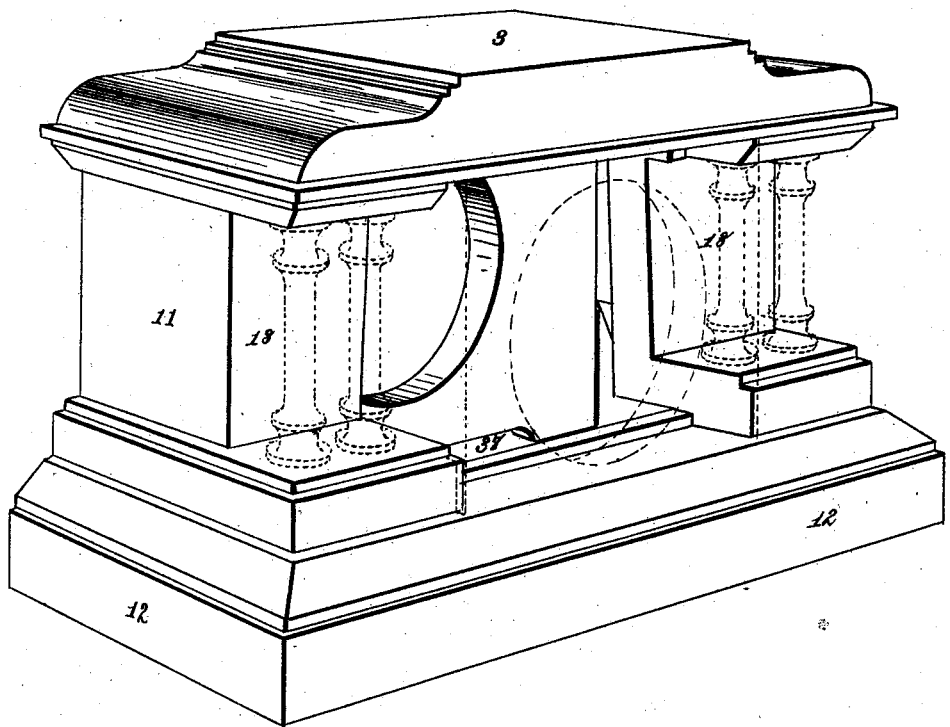
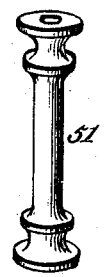
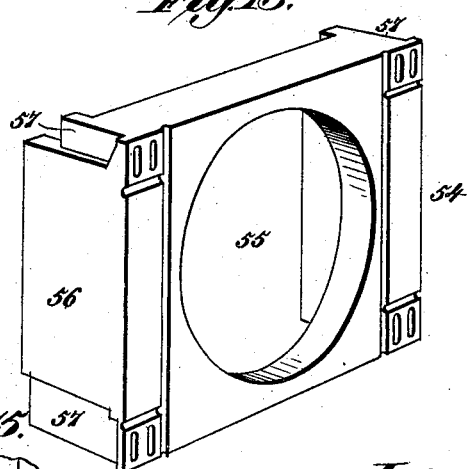
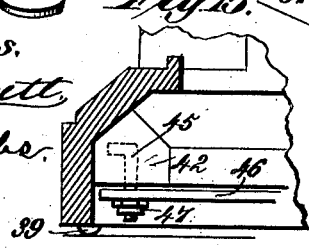
Witnesses.
Robert Everett
Vinton Coombs
Inventor:
Reese P. Coughlin.
By James L. Norris.
Atty.

UNITED STATES PATENT OFFICE.

REESE P. COUGHLIN, OF WINSTED, CONNECTICUT.

MANUFACTURE OF CLOCK-CASES AND OTHER ARTICLES FROM PLASTIC MATERIAL.

SPECIFICATION forming part of Letters Patent No. 379,450, dated March 13, 1888.

Application filed March 16, 1887. Serial No. 231,125. (No model.)

*To all whom it may concern:*

Be it known that I, REESE P. COUGHLIN, a citizen of the United States, residing at Winsted, in the county of Litchfield and State of Connecticut, have invented new and useful Improvements in Manufacture of Clock-Cases and other Articles from Plastic Material, of which the following is a specification.

My invention relates to the manufacture of clock-cases and like articles from a plastic composition contained in a mold of suitable design and subjected therein to the pressure of a plunger of appropriate form, said plunger being attached to the upper platen of a power-press, while the mold is carried by the lower platen, and thereby forms the clock-case or other article in an inverted position.

The objects of my invention are to produce a clock-case formed under pressure from a plastic composition of artificial marble or like material, with fastenings for a sounding-board embedded in its base during the operation of pressing, and to improve the construction and ornamentation of the clock-case and facilitate its manufacture.

Figure 1:
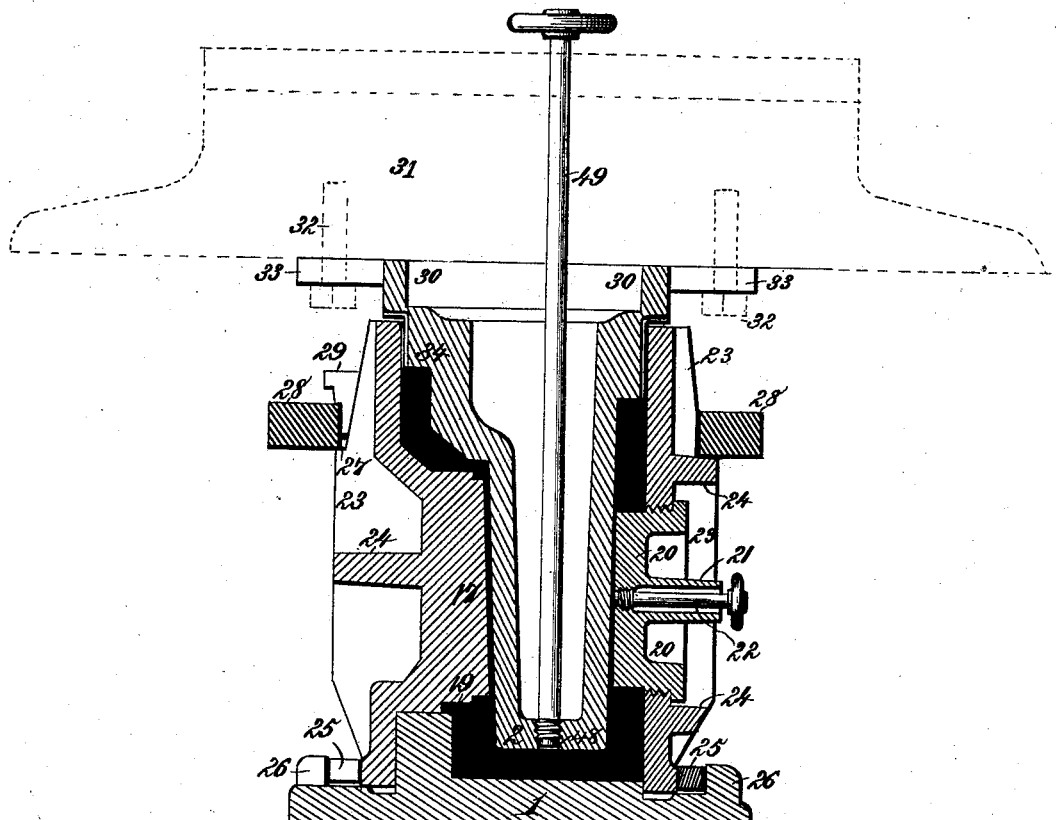
Figure 8:
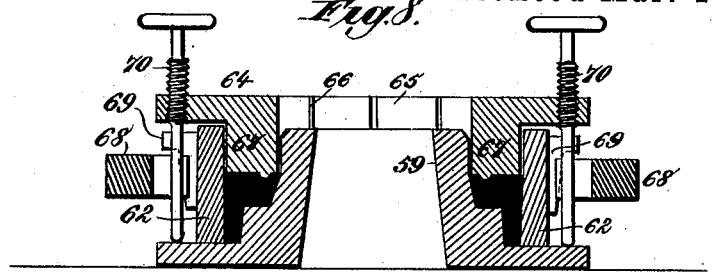
Figure 9:
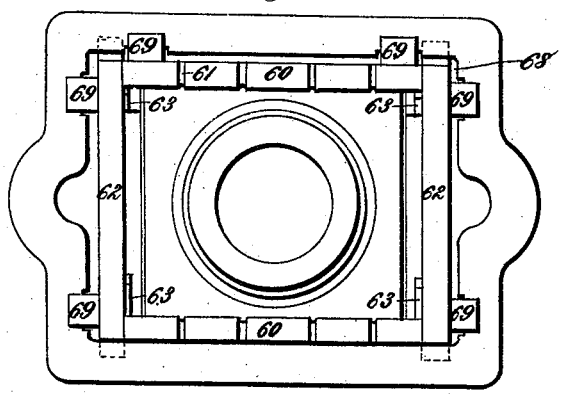
Figure 10:
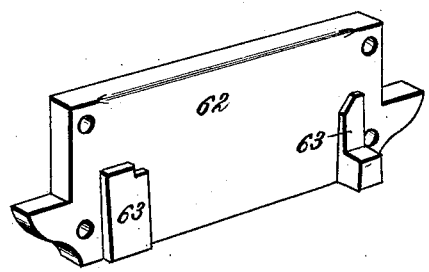
Figure 11:
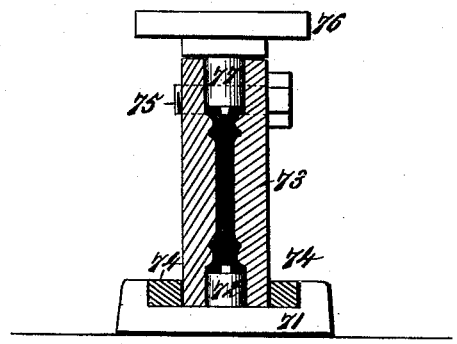

In the annexed drawings, illustrating the invention, Figure 1 is a vertical transverse section of my improved clock-case-molding apparatus in position in a press. Fig. 2 is a perspective of a portion of my improved mold viewed from the rear, showing its bottom plate, end plates, and main front portion connected, the back plate being removed to show the interior of the mold. Fig. 3 is a perspective of the outer face of the back plate with attached plug. Fig. 4 is a perspective of my improved plunger and attachments. Fig. 5 is a plug of the mold with the plunger and the clock-case in horizontal section. Fig. 6 is a sectional detail view of a portion of the plunger with loosely-attached sounding-board fastening to be embedded in the base of the clock-case, and showing, also, one of the studs for forming the recesses into which the legs or supports of the finished clock-case are to be inserted and one of the studs for forming a mortise or recess to receive a fastening for one of the columns for ornamenting the clock-case front. Fig. 7 is a perspective view of a thimble or sleeve by which the sounding-board fastening is temporarily attached to the plunger. Fig. 8 is a vertical transverse section of the mold-box and cover for forming the separate or auxiliary clock-case face-piece. Fig. 9 is a plan of said mold-box with cover removed. Fig. 10 is a perspective of one of the end plates of said mold-box. Fig. 11 is a vertical section of molding devices for forming columns to ornament the clock-case. Fig. 12 is a perspective of the main portion of my improved clock-case as it is taken from the principal mold, the position of the separately-molded face-piece and columns being indicated by dotted outlines. Fig. 13 is a perspective of the separately-molded face-piece with rabbeted corners. Fig. 14 is a perspective of one of the columns. Fig. 15 is a detail view of one of the lower corners of the clock-case, showing a portion of the sounding-board and one of the fastenings embedded in the base of the clock-case.

I will now proceed to describe my improvements in the manufacture of composition clock-cases with reference to the accompanying drawings, in which—

The numeral 1 designates the bottom plate of the principal mold which is employed in casting the main portion of the clock-case. This bottom plate, 1, has its upper surface formed to correspond with the lower face of a depending plunger, 2, and between these surfaces is shaped the top or roof 3 of the clock-case.

The bottom plate, 1, is formed with a base-flange, 4, having apertures 5 for passage of bolts or screws by which said bottom plate is secured to the movable lower platen, 6, of a hydraulic or other suitable press. After the bottom plate, 1, has been secured in the press the end plates, 7, are placed in position. These end plates, 7, are rabbeted at their lower ends to rest partly on the flanged portion 4 of the bottom plate and partly on the vertical offsetting portions or moldings 8, that extend transversely across the bottom plate, 1, near its ends. The end plates, 7, may be secured to the bottom plate, 1, partly by means of dowels on one part entering corresponding mortises in the other part, and they are securely locked in position by means of keys 9, forced between the lower external surfaces of said end plates and guides or bearings 10, formed on the ends of the bottom plate. The inner faces of the end plates, 7, are provided above and below or at other appropriate points with moldings or rabbets of suitable design to give a corresponding configuration to the ends 11 of the clock-case. These end plates, 7, are also somewhat reduced in thickness or set outward at their upper ends to afford a sufficient space for molding the enlarged base 12 of the clock-case.

After the bottom and end mold-plates, 1 and 7, have been connected together in the press, the main or skeleton front plate, 13, of the mold can be set up, as shown in Fig. 2, and afterward the back mold-plate, 14, Fig. 3, can be secured in place; or, if preferred, the back mold-plate can be set up first and then the front mold-plate.

The front and back mold-plates, 13 and 14, are connected to the end plates, 7, and bottom plate, 1, by dowels 15 on one part entering corresponding mortises in the adjacent part, or by any other suitable means.

As shown in Fig. 2, the main or skeleton front mold-plate, 13, is formed with a central rectangular opening, 16, on each side of which is an inward-projecting rectangular offset, 17, that enters into the formation of one of the rabbeted front portions, 18, of the clock-case. This front mold-plate, 13, is also formed above and below its rectangular opening 16 with horizontal moldings or beveled depressions 19, to give the desired form to the front of the clock-case base and front overhanging portion of its top, as shown in Fig. 12.

The back mold-plate, 14, is formed with a plain interior surface and has a central circular screw-threaded opening, which is closed by a screw disk or plug, 20, having a cross-bar or handle, 21, by which it can be screwed into place. Through the center of this disk and cross-bar is formed a vent-opening that is closed by a screw-plug, 22, for the purpose hereinafter explained.

As shown in Figs. 2, 3, and 5, the external surfaces of the end mold-plates, 7, front plate, 13, and back plate, 14, are provided with vertical strengthening-ribs 23, and the front and back plates may, in addition, be provided with horizontal cross-ribs 24, for a similar purpose.

When the front and back mold-plates, 13 and 14, are set up, they may be securely locked at the bottom by means of keys 25, forced behind guides 26 on the sides of the bottom plate, 1, whereby said keys have a bearing against the lower portions of the front and back plates, respectively.

It will be seen by reference to Fig. 2 that the vertical ribs 23 on the outer sides of the end mold-plates, 7, are formed with shoulders 27 near their upper ends. These shoulders 27, together with the upper horizontal ribs, 24, on the front and back mold-plates, afford support for an oblong ring or band, 28, Figs. 1 and 5, within which are inserted wedge-shaped keys 29, that bear against the beveled upper ends of the vertical ribs 23 on the end, back, and front plates, and so bind the parts of the mold closely together. It will be seen that by means of the described devices for securely locking the mold at top and bottom it is firmly braced throughout and enabled to resist any tendency to spread apart under the pressure to which the contents are to be subjected.

On first setting up the principal mold on the lower movable press-platen in the manner described it is preferable to place the plunger 2 in the mold in proper position, so as to secure an accurate adjustment of the several parts before finally securing them in place. The lower press-platen can now be moved upward until the flanged plunger-rim 30 is brought in contact with the upper or fixed press-platen, 31, to which it can then be permanently secured with the necessary accuracy by means of screws or bolts 32, passed through openings formed in lugs 33 on the plunger-rim. The plunger having been thus secured to the fixed upper platen in a depending position, the lower press-platen and attached mold will be lowered to receive the composition from which the clock-case is to be formed, after which it will be again raised to subject the plastic material to the action of the fixed plunger or die.

The plunger 2 is formed, as shown in Figs. 1, 4, and 5, to correspond with the desired shape to be given to the interior of the clock-case. Its enlarged upper portion or rim, 30, overlaps the vertical walls of the mold, as shown in Fig. 1, and beneath this enlarged rim 30 is a less-enlarged sub-rim, 34, which corresponds in general outline with the interior of the upper part of the mold, so as to be received within the same for the purpose of forming the lower edge of the inverted clock-case. In the vertical sides of this sub-rim 34 and in the under side of the rim 30 are formed grooves 35, to permit the escape of air and moisture during the operation of pressing and molding the clock-case or like article. The rear lower edge of the sub-rim 34 has a lip, 36, Fig. 4, by which an elongated air-opening or recess, 37, Fig. 12, is molded in the lower rear edge of the clock-case immediately beneath the sounding-board. At each corner of the sub-rim 34, and depending therefrom, are studs 38, for molding recesses or mortises in the corner edges of the clock-case base to receive metallic pins or buttons 39, Fig. 15, that serve as legs for the clock. These legs or supports can, however, be dispensed with; but when they are desired it is preferable to form their receiving-mortises in the manner described, as thereby all liability of injuring or defacing the clock-case with a boring or cutting instrument is conveniently avoided. Beneath the sub-rim 34 the enlarged portion of the plunger is again reduced in diameter to form a base, 40, having partly vertical and partly beveled or rounded sides to conform to the shape of the corresponding portions of the mold and give the desired form on all sides to the lower part of the clock-case. In each corner of this plunger-base 40 is a triangular recess, 41, for molding a ledge, 42, Fig. 15, of corresponding shape in each corner of the clock-case base to form a bearing for the sounding-board. The upper part of each recess 41 is bored to receive a loose-fitting thimble or sleeve, 43, Fig. 7, having a weak spring, 44, in one side, by which it is temporarily held in place. This sleeve or thimble is internally threaded and receives the screw-threaded end of a hooked fastening stud or bolt, 45, Fig. 6, which is to be embedded in the plastic composition in the operation of molding the clock-case. After the hooked end of the threaded bolt or stud 45 has become embedded in the clock-case ledge 42, and upon the descent of the mold and contained clock-case, the spring 44 will yield, so as to allow the sleeve or thimble 43 and attached bolt 45 to separate from the plunger and remain connected with the newly-molded clock-case. The sleeves or thimbles 43 can then be unscrewed from their attached bolts and replaced in the plunger for attachment of other bolts for future operation, while the bolts left embedded in the clock-case will serve for the attachment of the sounding-board 46, which is held in place thereon by means of nuts 47, as shown in Fig. 15, the hooked ends of these bolts 45 being adapted to afford a firm connection with the clock-case, whereby the sounding-board is held securely in place.

The general construction of the plunger in regard to peculiarities of form not above specified is clearly shown in Figs. 1, 4, and 5, and can be varied in non-essential particulars to correspond with the precise form to be given to the interior of any clock-case of this character.

As shown in Fig. 1, the plunger 2 is preferably hollow, for the sake of lightness and economy of material, and it has air-opening 48 located centrally in its lower end. This air-opening 48 communicates with the hollow interior of the plunger, and this in turn communicates with an opening through the upper platen, which affords passage for a rod, 49, that serves as a plug to close the air-opening 48 during the operation of molding. The rod 49 is screw-threaded at its lower end to engage the air-opening 48 closely, and at its upper end it is provided with a hand-wheel or other suitable handle, by which it can be readily placed in position or withdrawn when required. By withdrawing the rod 49 after the molding of the clock-case is completed, and before the descent of the lower press-platen, a sufficient access of air will be permitted between the plunger and the clock-case, and all liability of suction prevented when the lower platen and attached mold are lowered.

If the clock-case is to be molded with the rabbeted front portions, 18, the plunger will be provided on one side with an overhanging ledge, 50, to act conjointly with the upper ends of the offsetting projections 17 of the front mold-plate in forming the front lower portions of the clock-case at the points where the columns 51, Fig. 14, are to be supported. Near each end of the plunger-ledge 50 will be arranged two or more studs, 52, corresponding to the number of columns, and in the operation of molding the plastic composition these studs 52 will mold recesses or mortises for receiving screws or other fastenings to hold the columns 51 in place.

In the operation of molding the clock-case the disk 20, projecting inward from the back mold-plate, 14, serves to mold a circular recess in the clock-case back, which, when broken entirely through by means of a suitable instrument, forms a circular opening that is of advantage in introducing the clock mechanism into the case. After the movable press-platen has been lowered, together with the mold and molded clock-case, and before opening the mold, it is necessary to remove the disk 20, and this will be facilitated and injury to the clock-case prevented by first withdrawing the plug 22 from the center of the disk 20, thus admitting sufficient air to obviate suction.

For the purpose of facilitating the removal of the front and back plates, 13 and 14, they are provided with thumb-screws 53, as shown in Fig. 3, so as to bear against the edges of the end mold-plates, 7, whereby, when the locking devices of the front and back plates are removed and the thumb-screws 53 turned simultaneously in the proper direction, said front or back plate, as the case may be, will be moved gradually and uniformly away from the molded clock-case without causing any injury to its surface. After the front and back plates have been removed, the fastenings that hold the end plates, 7, will be withdrawn and said plates lifted carefully away from the molded article, which is thus left resting in an inverted position upon the bottom plate of the mold. The molded clock-case can now be set aside to further harden, after which it can be polished and otherwise ornamented in any desired manner.

A separate or auxiliary face-piece, 54, Fig. 13, is used to complete the front of the clock-case, as shown by dotted lines in Fig. 12. This auxiliary face-piece 54 has a rectangular form to correspond with the rectangular opening in the front of the case. In the center of the face-piece 54 is a circular opening, 55, for the clock dial and its frame. The length of the face-piece 54 from side to side is sufficient to enable it to overlap the vertical edges of the rectangular opening in the front of the clock-case. Its side portions or flanges, 56, are formed with rabbets 57, so that when it has been secured to the main clock-case by cement or otherwise said face-piece will form a close joint with the clock-case, of which it forms the prominent front portion.

The mold for forming the auxiliary face-piece is shown in Figs. 8 and 9 and has a rectangular form corresponding to that of the article to be molded. The lower portion of this mold is in the form of a box comprising a bottom plate, 58, having a central tapering sleeve, 59, that forms the central opening, 55, in the face-piece. This mold-box has removable guide-plates, two of which, as 60, have their upper edges provided with vent-grooves 61, Fig. 9, and the other two, as 62, Fig. 10, are provided on their inner sides with projections 63, to form the rabbet 57 in the sides of the face-piece. This mold is closed by a removable top or cover, 64, having a central opening, 65, the edges of which are provided with vent-grooves 66, that communicate along the under side of the cover with the vent-grooves 61, that are formed in the side plates of the mold. On the under side of the mold-cover 64 is an annular plunger, 67, that fits into the space between the mold sides and its central sleeve, and the face of this plunger may be provided with any design appropriate for the front of the face-piece. The bottom and side plates of the mold may be securely locked by any suitable means—as, for instance, by a band, 68, and keys 69, as shown. In order to lift the mold-cover 64 evenly and without injury to the casting, said cover can be provided at each end with lifting-screws 70, as shown in Fig. 8, the ends of the said screws being made to bear against the base-flange of the mold.

The mold for casting the ornamental columns 51 is of a well-known form and is shown in Fig. 11, in which 71 is a bottom plate having a central pillar or stud, 72, provided with a pin or tenon to form a mortise in the lower end of the column. 73 is a cylindrical halved mold secured at the bottom by keys 74 and at the top by a bolt, 75, or other fastening, and 76 is a top carrying a plunger or stud, 77, provided with a pin or tenon for forming a mortise in the upper end of the column. As shown in Fig. 12, these columns are used to ornament the front of the completed clock-case.

The molds shown in Figs. 8, 9, and 11 can be used in any suitable press.

The various parts of the molding apparatus are preferably made of brass, though other metal or suitable material may be used.

The plastic composition which I prefer to employ in the manufacture of my improved clock-case is similar to that described in my Patent No. 311,875, dated February 10, 1885, and is prepared and used substantially in the manner there set forth. It consists, principally, of "Keene's cement," water, alum, and resin, to which may be added glue and a suitable coloring-matter, such as ivory drop-black or pulp lamp-black. In making this composition there is first prepared a mixture of water, say two gallons; alum, one pound; resin, one pound, and glue, one-half pound. The alum, resin, and glue are first dissolved in the water, and when required for use the selected coloring-matter is added in sufficient quantity to impart the desired shade. With this mixture is thoroughly incorporated a sufficient quantity—say ten pounds—of Keene's cement or its equivalent to make a mass having the consistency of tempered potters' clay. Either Glauber's salt or Epsom salt or sulphate of manganese, or any two or all of these ingredients, may be used in place of alum. This plastic composition or its equivalent should be placed in the several molds in sufficient quantity to give the required thickness and density to the article when molded under pressure. Before introducing the plastic composition the interior of the molds and acting faces of the plunger or plungers should be oiled to prevent sticking. After removing the article from the mold, any surface imperfections that may exist can be dressed with the same composition and the surface then smoothed and polished. If desired, the completed article can be dipped in any suitable dye prior to final polishing.

What I claim as my invention is—

1. A clock-case having fastenings embedded in its base for attachment of a sounding-board, substantially as described.

2. A clock-case having threaded studs or bolts embedded in its base to serve for the attachment of nuts to secure a sounding-board, substantially as described.

3. A clock-case having interior ledges in each corner of its base and metallic fastenings embedded in said ledges for attachment of a sounding-board, substantially as described.

4. In a mold for clock-cases, the combination of a bottom plate shaped to mold the top of the case, end plates and front and back plates detachably secured to said bottom plates and to each other, guides or bearings formed on the base-flange of said bottom plate, intermediate keys for locking the lower ends of the end, back, and front plates, a ring or band surrounding the upper ends of said plates, and keys for locking the same at the top, substantially as described.

5. In a mold for clock-cases, the combination, with the bottom plate and the end plates, of front and back plates detachably secured to said bottom and end plates and provided with thumb-screws having a bearing against said end plates, whereby the front and back plates or either can be gradually and evenly detached without injury to the casting, substantially as described.

6. In a mold for clock-cases, the combination, with the bottom and end plates, of a back plate having thumb-screws 53, a central circular opening, a screw-disk, 20, adapted to fit said opening, said disk being provided with a central perforation or vent, and a screw-plug, 22, for closing said vent, substantially as described.

7. In a mold for clock-cases, the combination, with the bottom and end plates, of a front plate, 13, having a central rectangular opening, 16, and a back plate having a central circular opening closed by a disk, 20, provided with a plug-closed vent, substantially as described.

8. In a mold for clock-cases, the combination of the bottom plate having guideways 10 and 26, the end plates, 7, front plate, 13, and back plate, 14, provided with vertical ribs 23, the keys 9 and 25, the band 28, and the keys 29, substantially as described.

9. In a molding apparatus for clock-cases and like articles, the combination of a separable mold, a plunger having an air-opening in its lower end, and a rod passed vertically through the plunger to engage and control the air-opening, substantially as described.

10. In a molding apparatus for clock-cases and like articles, the combination, with a separable mold, of a plunger adapted to temporarily support and carry a set of fastenings to be embedded in the base of the plastic clock-case for attachment of a sounding-board, substantially as described.

11. In a molding apparatus for clock-cases, the combination, with a separable mold, of a plunger provided with depending studs or projections, as 38 and 52, to form mortises in the plastic clock-case for attachment of accessory parts, such as supports for the clock-case or fastenings for securing ornaments in place, substantially as described.

In testimony whereof I affix my signature in presence of two witnesses.

R. P. COUGHLIN.

Witnesses:
F. D. HALLETT,
CHARLES P. HALLETT.